United States Patent
Song et al.

(10) Patent No.: US 10,964,954 B2
(45) Date of Patent: Mar. 30, 2021

(54) STRETCHABLE ELECTRODE, ELECTROCHEMICAL DEVICE INCLUDING THE SAME, AND METHOD OF MANUFACTURING THE STRETCHABLE ELECTRODE

(71) Applicants: Samsung Electronics Co., Ltd., Suwon-si (KR); THE BOARD OF TRUSTEES OF THE LELAND STANFORD JUNIOR UNIVERSITY, Stanford, CA (US)

(72) Inventors: Minsang Song, Seongnam-si (KR); Kai Liu, Stanford, CA (US); Yi Cui, Stanford, CA (US)

(73) Assignees: SAMSUNG ELECTRONICS CO., LTD., Gyeonggi-Do (KR); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 360 days.

(21) Appl. No.: 15/973,999

(22) Filed: May 8, 2018

(65) Prior Publication Data
US 2019/0148737 A1    May 16, 2019

Related U.S. Application Data

(60) Provisional application No. 62/575,079, filed on Oct. 20, 2017.

(51) Int. Cl.
*H01M 4/70*    (2006.01)
*H01M 4/04*    (2006.01)
(Continued)

(52) U.S. Cl.
CPC ........... *H01M 4/70* (2013.01); *H01M 4/0404* (2013.01); *H01M 4/662* (2013.01); *H01M 4/667* (2013.01);
(Continued)

(58) Field of Classification Search
None
See application file for complete search history.

(56) References Cited

U.S. PATENT DOCUMENTS 7,758,993 B2    7/2010    Bischoff et al.
9,991,549 B2    6/2018    Kwon et al.
(Continued)

FOREIGN PATENT DOCUMENTS

CN    205828507 U    12/2016
KR    100477736 B1    6/2005
(Continued)

OTHER PUBLICATIONS

Kai Liu et al., "Stretchable Lithium Metal Anode with Improved Mechanical and Electrochemical Cycling Stability", Joule, Cell presess, Sep. 19, 2018, pp. 1857-1865, vol. 2, Issue 9.
(Continued)

*Primary Examiner* — Ula C Ruddock
*Assistant Examiner* — Tony S Chuo
(74) *Attorney, Agent, or Firm* — Cantor Colburn LLP

(57) ABSTRACT

A stretchable electrode includes: a current collector; and, disposed on a surface of the current collector, a metal layer or an electrode active material layer, wherein the current collector includes a spiral-type coil spring and an elastic polymer, the spiral-type coil spring including a coil spring wound in a spiral pattern around a point, and wherein the elastic polymer is disposed in at least a portion of an inside of the coil spring, in at least a portion of a space between spiral coils of the spiral-type coil spring, or both.

21 Claims, 8 Drawing Sheets

(51) Int. Cl.
 H01M 10/058 (2010.01)
 H01M 10/052 (2010.01)
 H01M 4/66 (2006.01)
 H01M 4/78 (2006.01)
 H01M 10/04 (2006.01)
 H01M 4/525 (2010.01)
 H01M 4/02 (2006.01)
 H01M 4/505 (2010.01)

(52) U.S. Cl.
 CPC ............ *H01M 4/668* (2013.01); *H01M 4/669* (2013.01); *H01M 4/78* (2013.01); *H01M 10/0436* (2013.01); *H01M 10/052* (2013.01); *H01M 10/058* (2013.01); *H01M 4/505* (2013.01); *H01M 4/525* (2013.01); *H01M 2004/021* (2013.01); *H01M 2220/30* (2013.01)

(56) References Cited

U.S. PATENT DOCUMENTS

| 2005/0089759 | A1* | 4/2005 | Hwang | H01M 4/667 429/245 |
| 2005/0233209 | A1* | 10/2005 | Sudano | H01M 2/263 429/160 |
| 2008/0187824 | A1* | 8/2008 | Tomantschger | H01M 4/244 429/122 |
| 2012/0095131 | A1* | 4/2012 | Kinoshita | H01M 4/622 523/410 |
| 2013/0011742 | A1* | 1/2013 | Park | H01M 4/661 429/234 |
| 2016/0197388 | A1* | 7/2016 | Kogan | H01M 4/42 429/406 |

FOREIGN PATENT DOCUMENTS

| KR | 100647570 B1 | 11/2006 |
| KR | 1020140094753 A | 7/2014 |
| KR | 101470559 B1 | 12/2014 |
| KR | 1020150061380 A | 6/2015 |
| KR | 1020150115213 A | 10/2015 |
| KR | 1020170014216 A | 2/2017 |

OTHER PUBLICATIONS

Sheng Xu et al., "Stretchable batteries with self-similar serpentine interconnects and integrated wireless recharging systems", Nature Communications, Feb. 26, 2013, pp. 1-8, vol. 4.

Supporting information for Stretchable Lithium Metal Anode with Improved Mechanical and Electrochemical Cycling Stability dated Sep. 19, 2018.

Wei Liu et al., "3D Porous Sponge-Inspired Electrode for Stretchable Lithium-Ion Batteries", Advanced Materials, Mar. 15, 2016, pp. 3578-3583, vol. 28.

Wei Liu et al., "Flexible and Stretchable Energy Storage: Recent Advances and Future Perspectives", Advanced Materials, Nov. 7, 2016, pp. 1-34, vol. 29, Issue 1.

Wei Weng et al., "A Gum-Like Lithium-Ion Battery Based on a Novel Arched Structure", Advanced Materials, Jan. 12, 2015, pp. 1363-1369, vol. 27, Issue 8.

* cited by examiner

STRETCHABLE ELECTRODE, ELECTROCHEMICAL DEVICE INCLUDING THE SAME, AND METHOD OF MANUFACTURING THE STRETCHABLE ELECTRODE

CROSS-REFERENCE TO RELATED APPLICATION

This application claims priority to and the benefit of U.S. Provisional Application No. 62/575,079, filed on Oct. 20, 2017, in the United States Patent and Trademark Office, the disclosure of which is incorporated herein in its entirety by reference.

BACKGROUND

1. Field

The present disclosure relates to stretchable electrodes, electrochemical devices including the same, and methods of manufacturing the stretchable electrodes.

2. Description of the Related Art

Body-attachable wearable electronic devices have recently attracted attention, and there is an increasing need for shape-changeable electrochemical devices, for example, shape-changeable batteries.

Batteries, for example, lithium batteries are generally of a rigid type, and thus are not readily amenable to being bent or stretched. These lithium batteries are not suitable for use as power sources of wearable electronic devices. However, alternative power sources have not achieved comparable energy density or charge/discharge performance.

Therefore, there is a need for a stretchable electrode for use in an electrochemical device, such as a battery, that is shape-changeable and has enhanced energy density and enhanced charge/discharge characteristics.

SUMMARY

Provided are stretchable electrodes exhibiting excellent charge/discharge characteristics such as Coulombic efficiency and lifespan characteristics before and after being stretched.

Provided are electrochemical devices including the stretchable electrodes.

Provided are methods of manufacturing stretchable electrodes exhibiting excellent charge/discharge characteristics such as Coulombic efficiency and lifespan characteristics before and after being stretched.

Additional aspects will be set forth in part in the description which follows and, in part, will be apparent from the description, or may be learned by practice of the presented exemplary embodiments.

According to an aspect of an embodiment, a stretchable electrode includes: a current collector; and, disposed on a surface of the current collector, a metal layer or an electrode active material layer, wherein the current collector includes a spiral-type coil spring and an elastic polymer, the spiral-type coil spring comprising a coil spring wound in a spiral pattern around a point, and wherein the elastic polymer is disposed in at least a portion of an inside of the coil spring, in at least a portion of a space between spiral coils of the spiral-type coil spring, or both.

According to an aspect of another embodiment, an electrochemical device includes: the stretchable electrode as a first electrode of the stretchable electrode, a second electrode, and an electrolyte disposed between the first electrode and the second electrode.

According to an aspect of another embodiment, a method of manufacturing a stretchable electrode includes: winding the coil spring in the spiral pattern around the point to provide the spiral-type coil spring; fabricating the spiral-type coil spring current collector by contacting the spiral-type coil spring and an elastic polymer solution; drying the spiral-type coil spring current collector, wherein the elastic polymer is disposed in the at least a portion of the inside the coil spring, in the at least a portion of the space between spiral coils of the spiral-type coil spring, or both; and disposing the metal layer or the electrode active material on the surface of the spiral-type coil spring current collector after removing the elastic polymer from the surface of the spiral-type coil spring current collector.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
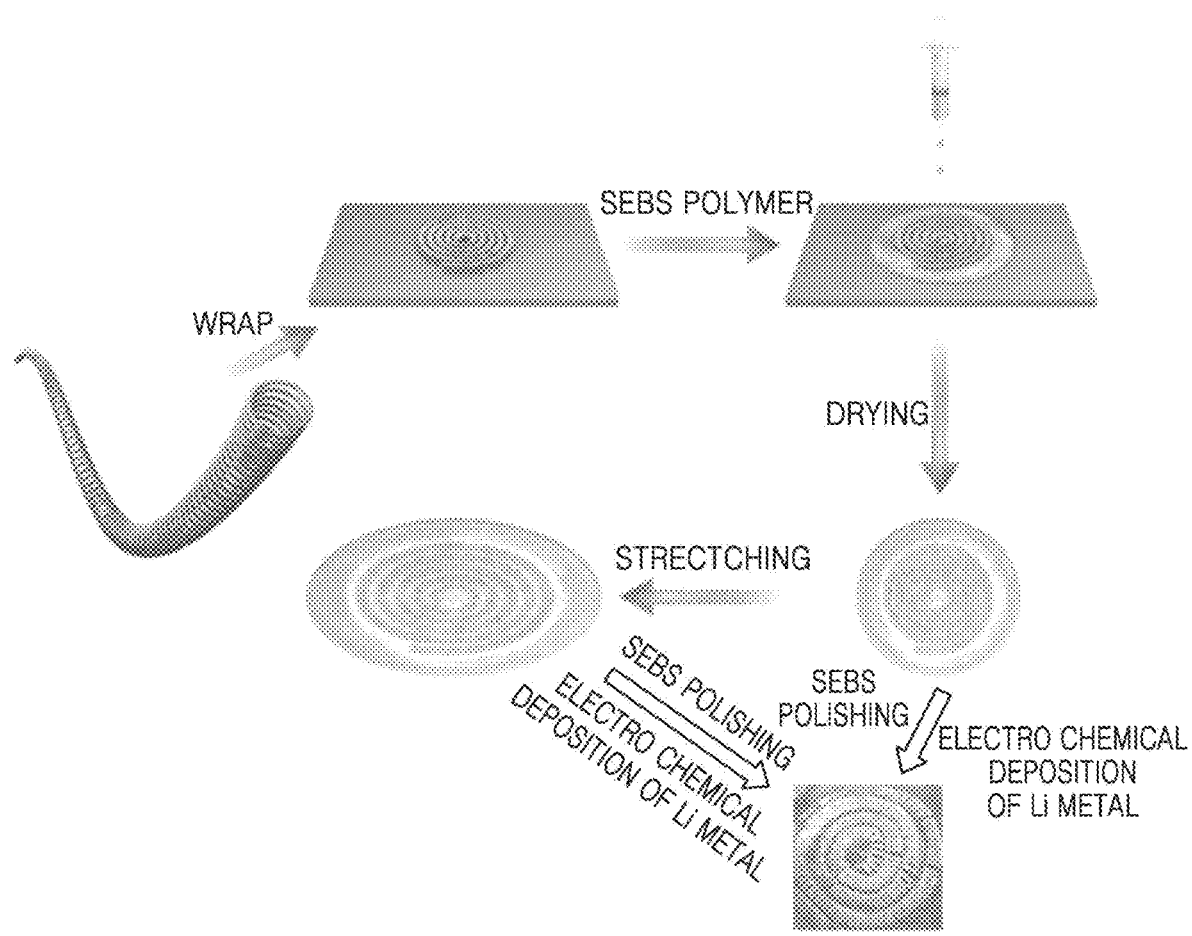
FIG. 1 is a schematic representation of a method of manufacturing a stretchable electrode, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions or exemplary embodiments set forth herein. Accordingly, the embodiments are described below, by referring to the figures, to explain aspects.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

Hereinafter, a stretchable electrode according to an embodiment of the present disclosure, an electrochemical device including the same, and a method of manufacturing the stretchable electrode will be described in detail with reference to the accompanying drawings. Embodiments set forth herein are provided for illustrative purposes only and are not intended to limit the present disclosure, and the present disclosure is defined only by the scope of the following claims.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof, unless otherwise specified herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The term "spiral-type" as used herein refers to a curved shape that is gradually wound away from a center about a point in a two-dimensional plane in a spiral pattern, and indicates a whirlpool form or a snail form, and is distinguished from a helical-type that is wound with the same diameter about a point in a three-dimensional structure.

The term "inner diameter" as used herein indicates an inner diameter of the spiral pattern, and is a diameter measured from a center to the innermost wound curve about a point in a "spiral-type" structure, and the term "outer diameter" as used herein indicates an outer diameter of the spiral pattern, and is a diameter measured from a center to the outermost wound curve about a point in a "spiral-type" structure.

The "elastic polymer" as used herein refers to an elastomer polymer, and is used to include, for example, a rubber polymer and/or a rubber copolymer, and the like.

The expression "disposed in at least a portion of an inside of the coil spring, at least a portion of a space between spiral coils of the spiral-type coil spring, or both" as used herein indicates that something is contained, filled, or embedded in at least a portion of an inside of the coil spring, at least a portion of a space between spiral windings, or spiral coils, of the spiral-type coil spring, or both. In an embodiment, the inside of the coil spring can include a space between the coils of the coil spring.

Recently, body-attachable wearable electronic devices have emerged on the market. Accordingly, there is an increasing need for batteries, for example, shape-changeable batteries as power sources of electrochemical devices. To manufacture such shape-changeable batteries, constitutional elements thereof are also required to be replaced by new shape-changeable constitutional elements.

However, to impart stretchability, an electrode as a novel shape-changeable element obtains large pore volume and large dead volume, resulting in significantly reduced energy density.

A stretchable electrode according to an embodiment includes: a current collector; and, disposed on a surface of the current collector, a metal layer or an electrode active material layer, wherein the current collector includes a spiral-type coil spring and an elastic polymer, the spiral-type coil spring comprising a coil spring wound in a spiral pattern around a point, and wherein the elastic polymer may be disposed in at least a portion of an inside of the coil spring, in at least a portion of a space between spiral coils of the spiral-type coil spring, or both.

The stretchable electrode according to an embodiment may include: a current collector; and a metal (layer) or an electrode active material layer disposed on a surface of the current collector. The current collector may include a spiral-type coil spring wound about a point and an elastic polymer. The elastic polymer may be disposed in at least a portion of an inside of the spiral-type coil spring and a space between coils of the spiral-type coil spring.

Since the stretchable electrode includes the current collector including a spiral-type coil spring and an elastic polymer, wherein the elastic polymer is disposed in at least a portion of an inside of the spiral-type coil spring, in at least a portion of a space between spiral coils of the spiral-type coil spring, or both, the stretchable electrode may have excellent stretchability. In addition, the stretchable electrode with excellent stretchability includes a metal layer or an electrode active material layer on a surface thereof, and thus an electrode and an electrochemical device that include the same may exhibit increased electrode area utilization and an increased loading amount of electrode active material, and, accordingly, may have high energy density and enhanced charge/discharge characteristics such as Coulombic efficiency and lifespan characteristics.

The metal layer or the electrode active material layer may have a shape corresponding to, for example substantially the same as, that of the current collector. The metal layer or the electrode active material layer may have a spiral-type coil spring form corresponding to the shape of the current collector including the spiral-type coil spring.

The spiral-type coil spring may have an inner diameter of about 10 micrometers (μm) to about 500 μm. The spiral-type coil spring may have an inner diameter of, for example, about 50 μm to about 300 μm, for example, about 100 μm to about 200 μm. In other embodiments, the inner diameter can be about 10 μm to about 300 μm, about 20 μm to about 200 μm, about 30 μm to about 100 μm, about 50 μm to about 200 μm, about 10 μm to about 100 μm, about 150 μm to about 300 μm, or about 200 μm to about 300 μm.

The spiral-type coil spring may have a diameter of the coil spring of about 50 μm to about 800 μm. For example, the diameter of the coil spring of the spiral-type coil spring may range from about 250 μm to 600 μm, for example, about 350 μm to about 450 μm. In other embodiment, the diameter of the coil spring is about 100 μm to about 500 μm, about 150 μm to about 400 μm, about 200 μm to about 400 μm, about 250 μm to about 450 μm, or about 200 μm to about 300 μm. The spiral-type coil spring is appropriately dimensioned within the above inner diameter and the diameter of the coil spring ranges, and thus may freely change the form of the electrode in accordance with the size and type of an electrochemical device including the same, for example, a battery.

The spiral-type coil spring may include copper, stainless steel, aluminum, nickel, or titanium; copper or stainless steel, each of which may be surface-treated with carbon, nickel, titanium, or silver; an aluminum-cadmium alloy; or a combination thereof. In some embodiments, the spiral-type coil spring may include a non-conductive or conductive polymer surface-treated with polyacetylene, polyaniline, polypyrrole, polythiophene, polysulfur nitride, indium tin oxide (ITO), or the like.

The current collector may have a maximum elongation of 100%, which is relative to 0% elongation in the absence of stretching. The current collector may, for example, be stretched to an elongation of 10%, 20%, 40%, 60%, 80%, or 100% in accordance with the size and type of an electrochemical device including the same, for example, a battery. An electrode and electrochemical device including such a current collector may exhibit high energy density and enhanced charge/discharge characteristics such as Coulombic efficiency and lifespan characteristics.

The current collector may have a difference between electrical resistances at 80% elongation and before stretching (i.e., 0% elongation) of about 0.5 ohm (Ω) or less. The difference between electrical resistances at 80% elongation and before stretching of the current collector may be, for example, about 0.4 Ω or less, for example, about 0.3 Ω or less, or about 0.2 Ω or less. Due to this configuration, an electrode and electrochemical device including the current collector may have enhanced charge/discharge characteristics such as Coulombic efficiency and lifespan characteristics.

The metal layer may include an alkaline metal. The alkaline metal may include lithium, sodium, potassium, or the like. The alkaline metal may be, for example, lithium metal.

The metal layer may be a metal layer that is electrodeposited on a surface of the current collector during operation of an electrochemical device including the stretchable electrode. For example, the metal, e.g., metal ions in an electrolyte, may transfer from a cathode and be directly deposited on an anode during charging of an electrochemical device including the stretchable electrode, for example, a metal battery including the stretchable electrode. The metal layer may be electrodeposited, for example with uniform amount and thickness over an entire surface of the current collector, and thus electric potential thereof may be stabilized. Accordingly, a stretchable electrode and electrochemical device including the same may have enhanced charge/discharge characteristics such as Coulombic efficiency and lifespan characteristics.

For example, the metal layer may be electrodeposited at a capacity per unit area of about 0.5 milliampere hours per square centimeter (mAh/cm$^2$) to about 6 mAh/cm$^2$, for example, about 0.5 mAh/cm$^2$ to about 5 mAh/cm$^2$, for example, about 3 mAh/cm$^2$ to about 4 mAh/cm$^2$. Due to electrodeposition of the metal layer within the above range of the capacity per unit area, the stretchable electrode including the metal layer may have a stabilized electric potential, and the stretchable electrode and the electrochemical device may have enhanced charge/discharge characteristics such as Coulombic efficiency and lifespan characteristics.

The electrode active material layer may be a coating layer including an electrode active material, a conductive material, and a binder. The electrode active material layer may be a cathode active material layer or an anode active material layer. For example, the electrode active material layer may be a cathode active material layer.

The cathode active material layer may be formed by preparing a cathode active material composition by mixing a cathode active material, a binder, and a solvent, or adding a conductive material thereto according to need, and directly coating the current collector therewith. In another embodiment, the cathode active material layer may be formed by casting a cathode active material composition onto a separate support and laminating a cathode active material film separated from the support on the current collector.

The cathode active material may be any suitable cathode active material including those used in the art without limitation, for example, a material capable of reversibly intercalating or deintercalating lithium ions. The material capable of reversibly intercalating or deintercalating lithium ions may include, for example, at least one of the composite oxides of lithium with a metal such as cobalt, manganese, nickel, and combinations thereof. For example, the cathode active material may be a compound represented by any one of the following formulae: $Li_aA_{1-b}B'_bD'_2$ where $0.90 \leq a \leq 1.8$ and $0 \leq b \leq 0.5$; $Li_aB'_aB'_bO_{1-c}D'_c$ where $0.90 \leq a \leq 1.8$, $0 \leq b \leq 0.5$, and $0 \leq c \leq 0.05$; $LiE_{2-b}B'_bO_{4-c}D'_c$ where $0 \leq b \leq 0.5$ and $0 \leq c \leq 0.05$; $Li_aNi_{1-b-c}Co_bB'_cD'_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bB'_cO_{2-\alpha}F'_2$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cD'_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cO_{2-\alpha}F'_2$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dG_eO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A is nickel (Ni), cobalt (Co), manganese (Mn), or a combination thereof; B' is aluminum (Al), Ni, Co, Mn, chromium (Cr), iron (Fe), magnesium (Mg), strontium (Sr), vanadium (V), a rare earth element, or a combination thereof; D' is oxygen (0), fluorine (F), sulfur (S), phosphorus (P), or a combination thereof; E is Co, Mn, or a combination thereof; F' is F, S, P, or a combination thereof; G is Al, Cr, Mn, Fe, Mg, lanthanum (La), cerium (Ce), strontium (Sr), V, or a combination thereof; Q is titanium (Ti), molybdenum (Mo), Mn, or a combination thereof; I' is Cr, V, Fe, scandium (Sc), yttrium (Y), or a combination thereof; and J is V, Cr, Mn, Co, Ni, copper (Cu), or a combination thereof. In addition, the compounds described above may have a coating layer on their surfaces, or the compounds described above may be used in combination with the compounds having a coating layer. The coating layer may include a coating element compound, such as an oxide of a coating element, a hydroxide of a coating element, an oxyhydroxide of a coating element, an oxycarbonate of a coating element, or a hydroxy carbonate of a coating element. The coating element compounds may be amorphous or crystalline. The coating element included in the coating layer may be Mg, Al, Co, K, Na, Ca, Si, Ti, V, Sn, Ge, Ga, B, As, Zr, or a mixture thereof. A coating layer may be formed using the coating elements in the aforementioned compounds by using any one of various methods that do not adversely affect physical properties of the cathode active material (e.g., spray coating or immersion). This may be well understood by those of ordinary skill in the art, and thus a detailed description thereof will not be provided herein.

For example, the cathode active material may include a lithium transition metal oxide, for example, $Li_{1+x}(M)_{1-x}O_2$ where $0.05 \leq x \leq 0.2$ and M may be a transition metal. Non-limiting examples of the transition metal M include Ni, Co, Mn, Fe, Ti, or a combination thereof. For example, the cathode active material may be $LiMn_2O_4$, $LiNi_2O_4$, $LiCoO_2$, $LiNiO_2$, $LiMnO_2$, $Li_2MnO_3$, $LiFePO_4$, $LiNi_xCo_yO_2$ where $0<x<0.15$ and $0<y \leq 0.85$, or the like.

The binder may be a poly(C1-C12 alkyl)acrylate (PAA), lithium polyacrylate (LiPAA), vinylidene fluoride/hexafluoropropylene copolymers polyvinylidene fluoride, polyacrylonitrile, poly(methyl methacrylate), polytetrafluoroethylene (PTFE), styrene-butadiene rubber polymer, and the like, but the present disclosure is not limited to the above examples. That is, any suitable binder, including those that may be used in the art, may be additionally used.

Non-limiting examples of the conductive material include acetylene black, carbon black, natural graphite, artificial graphite, Ketjen black, or carbon fibers; carbon nanotubes; metal powders, fibers or tubes of copper, nickel, aluminum, or silver; and conductive polymers such as polyphenylene derivatives. Any suitable conductive material, including those that may be used in the art, may be used.

The solvent may be N-methylpyrrolidone (NMP), acetone, water, or the like, but the present disclosure is not limited to the above examples. That is, any suitable solvent, including those that may be used in the art, may be used.

In some embodiments, the electrode active material layer may be an anode active material layer. The anode active material layer may be formed using the same method as that used for forming the cathode active material layer, except that an anode active material is used instead of the cathode active material. In addition, a binder, a conductive material, and a solvent that are used in an anode active material composition may be the same as those of the cathode active material layer. The anode active material may include at least one anode active material such as lithium metal, metals alloyable with lithium, transition metal oxides, non-transition metal oxides, and carbonaceous materials.

For example, the metal alloyable with lithium may be Si; Sn; Al; Ge; Pb; Bi; Sb; an Si—Y' alloy where Y' is an alkali metal, an alkali earth metal, a Group 13 to 16 element, a transition metal, a rare-earth element, or a combination thereof and is not Si; an Sn—Y' alloy where Y' is an alkali metal, alkali earth metal, a Group 13 to 16 element, a transition metal, a rare-earth element, or a combination thereof and is not Sn, or the like. The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may be lithium titanium oxide, vanadium oxide, lithium vanadium oxide, or the like.

For example, the non-transition metal oxide may be $SnO_2$, $SiO_x$ where $0<x<2$, or the like.

The carbonaceous material may be crystalline carbon, amorphous carbon, or a mixture thereof. Non-limiting examples of the crystalline carbon include natural graphite or artificial graphite, each of which has a non-shaped (e.g., amorphous) form, a plate form, a flake form, a spherical form, or a fibrous form. Non-limiting examples of the amorphous carbon include soft carbon (low-temperature calcined carbon), hard carbon, meso-phase pitch carbonization products, and calcined coke.

The elastic polymer may be a thermoplastic elastic polymer that includes a polystyrene, a polyester, a polyolefin, a polyurethane, a copolymer thereof, or a combination thereof. In an embodiment, the elastic polymer may be molded only by one process, and thus excellent processability may be secured and the elastic polymer may be used at low cost.

Examples of the elastic polymer may include a poly (styrene-butadiene) (SBR) block copolymer, a poly(styrene-butadiene-styrene) (SBS) block copolymer, a poly(styrene-isoprene-styrene) (SIS) block copolymer, a poly(styrene-ethylene-butylene-styrene) (SEBS) block copolymer, a polyurethane, or a combination thereof.

For example, the elastic polymer may include an SBR block copolymer, an SBS block copolymer, an SIS block copolymer, an SEBS block copolymer, or a combination thereof.

For example, the elastic polymer may include an SBR block copolymer, an SBS block copolymer, an SIS block copolymer, an SEBS block copolymer, or a combination thereof, for example, an SEBS block copolymer. Such elastic polymers may include polystyrene as hard segments at opposite ends and polybutadiene, isoprene, ethylene, or butylene as a middle soft segment, and thus may have stretchability and sufficient mechanical strength.

The elastic polymer may have a weight average molecular weight of about 80,000 Dalton (Da) to about 1,500,000 Da. The weight average molecular weight of the elastic polymer may range from, for example, about 90,000 Da to about 1,300,000 Da, for example, about 100,000 Da to about 1,300,000 Da, for example, about 200,000 Da to about 1,300,000 Da, for example, about 300,000 Da to about 1,300,000 Da, for example, about 400,000 Da to about 1,300,000 Da, for example, about 500,000 Da to about 1,300,000 Da, for example, about 600,000 Da to about 1,300,000 Da, for example, about 700,000 Da to about 1,300,000 Da, for example, about 800,000 Da to about 1,300,000 Da, about 900,000 Da to about 1,300,000 Da, for example, about 1,000,000 Da to about 1,200,000 Da. The weight average molecular weight of the elastic polymer is measured by gel permeation chromatography (GPC) using a polystyrene standard sample. When the weight average molecular weight of the elastic polymer is within the above range, sufficient mechanical strength and stretchability may be secured.

An electrochemical device according to another embodiment may include: the above-described stretchable electrode as a first electrode; a second electrode; and an electrolyte disposed between the first electrode and the second electrode.

The electrochemical device may be, for example, a lithium secondary battery. The electrochemical device may be, for example, a Li-metal secondary battery.

Figure 10:
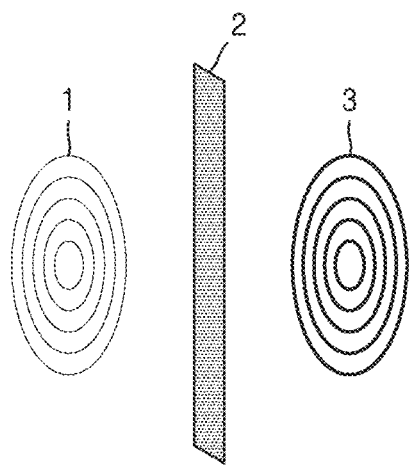
FIG. 10 illustrates schematic views of a lithium secondary battery (full-cell) according to an embodiment.

FIG. 10 is a schematic view of a lithium secondary battery (full-cell) according to an embodiment.

Referring to FIG. 10, the lithium secondary battery (full-cell) is configured such that a separator 2 is disposed between a stretchable Li anode 1 and a stretchable cathode 3 ($LiFePO_4$).

The first electrode may be an anode. The second electrode may be a cathode. For example, the first electrode includes: a current collector; and a metal layer disposed on a surface of the current collector, wherein the current collector includes a spiral-type coil spring and an elastic polymer, the spiral-type coil spring comprising a coil spring wound in a spiral pattern around a point, and wherein the elastic polymer may be disposed in at least a portion of an inside of the coil spring, in at least a portion of a space between spiral coils of the spiral-type coil spring, or both.

In addition, the first electrode may be a cathode. The second electrode may be an anode. For example, the first electrode includes: a current collector; and an electrode active material layer disposed on a surface of the current collector, wherein the current collector includes a spiral-type coil spring and an elastic polymer, the spiral-type coil spring comprising a coil spring wound in a spiral pattern around a point, and wherein the elastic polymer may be disposed in at least a portion of an inside of the coil spring, in at least a portion of a space between spiral coils of the spiral-type coil spring, or both.

Detailed configurations related to the current collector, the metal layer, the electrode active material layer, the spiral-type coil spring, and the elastic polymer are the same as described above, and thus a detailed description thereof will be omitted.

The electrolyte may be a liquid electrolyte including a non-aqueous organic solvent and a lithium salt.

The non-aqueous organic solvent may be any non-aqueous organic solvent that may be used in the art. Non-limiting examples of the non-aqueous organic solvent include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethyl acetamide, dimethylsulfoxide, dioxane, 1,2-dimethoxyethane, sulfolane, dichloroethane, chlorobenzene, nitrobenzene, diethylene glycol, dimethylether, and combinations thereof.

The non-aqueous organic solvent may be used alone or two or more of these materials may be used in combination. When two or more of these materials are used in combination, a mixing ratio may be appropriately adjusted according to desired battery performance, and this may be well understood by those of ordinary skill in the art.

For example, in the case of carbonate-containing solvents, a cyclic carbonate and a linear carbonate may be used in combination. In this case, the cyclic carbonate and the linear carbonate may be mixed in a volume ratio of about 1:1 to about 1:9, and thus excellent electrolyte performance may be obtained.

The lithium salt may be any suitable lithium salt, including those that may be used in the art. Non-limiting examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, LiI, and combinations thereof.

In the electrolyte, the lithium salt may have a concentration of about 0.1 molar (M) to about 2.0 M. When the concentration of the lithium salt is within the above range, the electrolyte has appropriate conductivity and viscosity, and thus excellent electrolyte performance may be obtained, and lithium ions may effectively transfer.

According to need, the electrolyte may further include an additive. For example, the electrolyte may include vinylene carbonate (VC), catechol carbonate (CC), or the like to form and maintain a solid electrolyte interface (SEI) layer on a surface of the anode. To prevent overcharging, the electrolyte may include a redox-shuttle type additive such as n-butylferrocene, a halogen-substituted benzene, or the like, and an additive for forming a film, such as cyclohexylbenzene, biphenyl, or the like. In order to enhance conduction characteristics, the electrolyte may include a cation receptor of a crown ether-based compound or the like and an anion receptor of a boron-based compound or the like. The electrolyte may include, as a flame retardant, a phosphate-based compound such as trimethyl phosphate (TMP), tris(2,2,2-trifluoroethyl) phosphate (TFP), hexamethoxycyclotriphosphazene (HMTP), or the like.

According to need, the electrolyte may further include an ionic liquid.

The ionic liquid may be a compound comprising, for example consisting of, linear or branched substituted ammonium, imidazolium, pyrrolidinium, or piperidinium cations and anions such as $PF_6^-$, $BF_4^-$, $CF_3SO_3^-$, $(CF_3SO_2)_2N^-$, $(C_2F_5SO_2)_2N^-$, $(CN)_2N^-$, or the like.

A separator may be disposed between the first electrode and the second electrode.

The separator may be any suitable separator, including those that may be used in the art. In particular, a separator having low resistance to transfer of ions in an electrolyte and high electrolyte-retaining ability is suitable for use as the separator. For example, the separator may be formed of a material such as glass fiber, polyester, polyethylene, polypropylene, polytetrafluoroethylene (PTFE), and combinations thereof, each of which may be a nonwoven fabric or a woven fabric. The separator may generally have a pore diameter of from about 0.01 μm to about 10 μm and generally have a thickness of about 5 μm to about 300 μm. The separator may be used in various forms such as a single layer, a double layer, a triple layer, or the like.

The electrochemical device, for example, a lithium secondary battery may have a capacity after stretching to 60% elongation 100 times of about 90% or more of a capacity before stretching. The electrochemical device, for example, a lithium secondary battery may maintain a Coulombic efficiency after stretching to 60% elongation 100 times of about 90% or more and a Coulombic efficiency before stretching of about 90% or more. Such an electrochemical device has excellent charge/discharge characteristics, such as high capacity, high Coulombic efficiency, and excellent lifespan characteristics. The lithium secondary battery may be a coin type, button type, sheet type, stacked type, cylindrical type, flat type, or horn type battery according to the shape thereof, but the present disclosure is not limited to the above examples. In addition, the lithium secondary battery may be used as a power source of a body-attachable wearable electronic device, and may be used as a secondary battery for various applications such as electric bikes, notebook computers, smart watches, smart phones, electric vehicles, and the like.

A method of manufacturing the stretchable electrode, according to another embodiment may include: fabricating a coil spring by winding a metal wire on a heterogeneous metal wire having a predetermined diameter; removing the heterogeneous metal wire from the fabricated coil spring and then fabricating a spiral-type coil spring wound about a point; fabricating a spiral-type coil spring current collector by bringing the spiral-type coil spring into contact with an elastic polymer solution and drying the resulting coil spring, wherein an elastic polymer is embedded inside of the coil spring and a space between the spiral-type coil springs; and removing by polishing the elastic polymer remaining on a surface of the spiral-type coil spring current collector and then manufacturing and operating a cell including the same to subject the current collector to be electrodeposition of a metal layer thereon to thereby complete manufacture of the above-described stretchable electrode.

FIG. 1 is a view illustrating a method of manufacturing a stretchable electrode according to an embodiment.

Referring to FIG. 1, first, a metal wire is wound on a metal wire of the same type or a heterogeneous metal wire having a predetermined diameter to fabricate a coil spring. The metal wire may include copper, stainless steel, aluminum, nickel, or titanium; copper or stainless steel surface-treated with carbon, nickel, titanium, or silver; an aluminum-cadmium alloy; or a combination thereof. In some embodiments, the metal wire may include a non-conductive or conductive polymer surface-treated with polyacetylene, polyaniline, polypyrrole, polythiophene, polysulfur nitride, ITO, or the like. The type of the heterogeneous metal wire is not particularly limited as long as it is distinguishable from, i.e., not the same as, the metal wire used in the coil spring. In this case, the heterogeneous metal wire may have a diameter of, for example, from about 10 μm to about 500 μm.

Next, the heterogeneous metal wire is removed from the fabricated coil spring, and then the coil spring is wound about a point to fabricate a spiral-type coil spring.

Next, the spiral-type coil spring is brought into contact with an elastic polymer solution and then dried to fabricate a spiral-type coil spring current collector wherein an elastic polymer is embedded inside the coil spring and a space between the spiral-type coil springs. Bringing the spiral-type coil spring into contact with the elastic polymer solution may be performed by dropping, immersion, or the like. The drying process may be performed, for example, at room temperature in an air atmosphere.

Next, the elastic polymer remaining on a surface of the spiral-type coil spring current collector is removed by polishing. The polishing removal process may be performed by electrolytic polishing, mechanical polishing, or the like.

Before or after polishing of the remaining elastic polymer, the spiral-type coil spring current collector may be stretched up to maximum elongation of 100%.

After the remaining elastic polymer is polished, a cell including the spiral-type coil spring current collector is manufactured and operates (charged and discharged) to subject the current collector to electrodeposition of a metal layer thereon, thereby completing manufacture of the above-described stretchable electrode.

The metal layer may include an alkali metal. The alkali metal may include lithium, sodium, potassium, or the like. The alkali metal may be, for example, lithium metal.

The electrodeposition of the metal layer may be performed with a determined capacity by applying a current density of, for example, from about 0.1 mA/cm$^2$ to about 1 mA/cm$^2$. The electrodeposition of the metal layer may be performed for about 0.5 hours to about 6 hours. The metal layer may be electrodeposited to a capacity per unit area of from about 0.5 mAh/cm$^2$ to about 6 mAh/cm$^2$.

Hereinafter, the present disclosure will be described in further detail with reference to the following Examples and Comparative Example. However, these examples are provided for illustrative purposes only and are not intended to limit the present disclosure.

EXAMPLES

Manufacture of Anode and Lithium Secondary Battery

Example 1

Manufacture of Stretchable Anode and Lithium Secondary Battery (Coin Half-Cell)

A copper (Cu) wire having a diameter of 150 μm was wound on an aluminum (Al) coil spring wire having an inner diameter of 500 μm to fabricate a Cu coil spring. The Al coil spring wire was removed from the fabricated Cu coil spring, and then the Cu coil spring was wound in a spiral pattern about a point to fabricate a spiral-type Cu coil spring (outer diameter: about 1 cm, thickness: about 800 μm).

A solution prepared by dissolving 30 weight percent (wt%) of a poly(styrene-ethylene-butylene-styrene) (SEBS) block copolymer (manufacturer: Kraton G, weight average molecular weight: 110,000 Daltons) in toluene was added dropwise to the spiral-type Cu coil spring, followed by drying at room temperature, to fabricate a spiral-type Cu coil spring current collector in which the SEBS block copolymer was embedded inside the Cu coil spring and a space between the spiral coils of the spiral-type Cu coil spring.

The SEBS block copolymer remaining on a surface of the spiral-type Cu coil spring was removed by polishing to expose a surface of the spiral-type Cu coil spring to the outside, thereby completing fabrication of an anode for a coin half-cell before lithium electrodeposition.

In an argon glove box, the anode for a coin half-cell before lithium electrodeposition, lithium metal as a counter electrode, a 25 μm microporous triple layer formed of polypropylene/polyethylene/polypropylene (Cellgare 2325) as a separator, and an electrolyte prepared by adding 1 M lithium bis(trifluoromethanesulfonyl)imide (LiFSI) to a mixed organic solvent of 1 wt% of lithium nitrate and 1,3-dioxolane (DOL) and 1,2-dimethoxyethane (DME) in a volume ratio of 1:1 were used to manufacture a lithium secondary battery (coin half-cell). The manufactured lithium secondary battery (coin half-cell) was subjected to lithium electrodeposition at a current density of 1 mA/cm$^2$ and a capacity per unit area of 1 mAh/cm$^2$, thereby completing manufacture of a lithium secondary battery (coin half-cell) including a stretchable anode.

Example 2

Manufacture of Lithium Secondary Battery (Full-Cell)

The lithium secondary battery (coin half-cell) manufactured according to Example 1 was disassembled to obtain the lithium-electrodeposited stretchable anode.

An Al wire having a diameter of 150 μm was wound on an Al coil spring wire having an inner diameter of 500 μm to fabricate a coil spring. The Al wire was removed from the fabricated Al coil spring, and then the coil spring was wound in a spiral pattern about a point to fabricate a spiral-type Al coil spring (outer diameter: about 1 cm, thickness: about 800 μm.

A solution prepared by dissolving 30 wt% of an SEBS block copolymer (manufacturer: Kraton G, weight average molecular weight: 110,000 Daltons) in toluene was added dropwise to the spiral-type Al coil spring, followed by drying at room temperature, to fabricate a spiral-type Al coil spring current collector in which the SEBS block copolymer was embedded inside the Al coil spring and a space between the spiral coils of the spiral-type Al coil spring.

The SEBS block copolymer remaining on a surface of the spiral-type Al coil spring was removed by polishing to expose a surface of the spiral-type Al coil spring to the outside, thereby completing fabrication of a spiral-type Al current collector. LiFePO$_4$ powder (manufactured by MTI Corporation) as a cathode active material, carbon black (manufactured by MTI Corporation) as a conductive material, and polyvinylidene fluoride were mixed in a weight ratio of 80:10:10 with N-methyl-2-pyrrolidone (NMP) to obtain a cathode composition slurry. The cathode composition slurry was coated on the fabricated spiral-type coil spring current collector and dried at 25° C., and then the dried resultant was dried in vacuum at about 60° C. for 6 hours, thereby completing the fabrication of a stretchable cathode.

In an argon glove box, the fabricated stretchable cathode, the Li-electrodeposited stretchable anode obtained by disassembling the lithium secondary battery (coin half-cell) of Example 1, a 25 μm microporous triple layer formed of polypropylene/polyethylene/polypropylene (Cellgare 2325) as a separator, and an electrolyte prepared by adding 1 M lithium hexafluorophosphate (LiPF$_6$) to a mixed organic solvent of ethylene carbonate (EC) and diethyl carbonate (DEC) in a volume ratio of 1:1 were used to manufacture a lithium secondary battery (CR2032 coin full-cell).

Comparative Example 1

Manufacture of Anode and Lithium Secondary Battery (Coin Half-Cell)

A lithium secondary battery (coin half-cell) including an anode was manufactured in the same manner as in Example 1, except that a Cu foil current collector was used instead of the spiral-type Cu coil spring current collector. Analysis Example 1: Scanning Electron Microscopic (SEM) Image SEM analysis was performed on the anode for a coin half-cell before lithium electrodeposition, used in Example 1. The SEM analysis was performed using an FEI XL30 Sirion SEM. The results thereof are shown in FIG. 2A (magnification of ×100) and FIG. 2B (magnification of ×500).

Figure 2A:
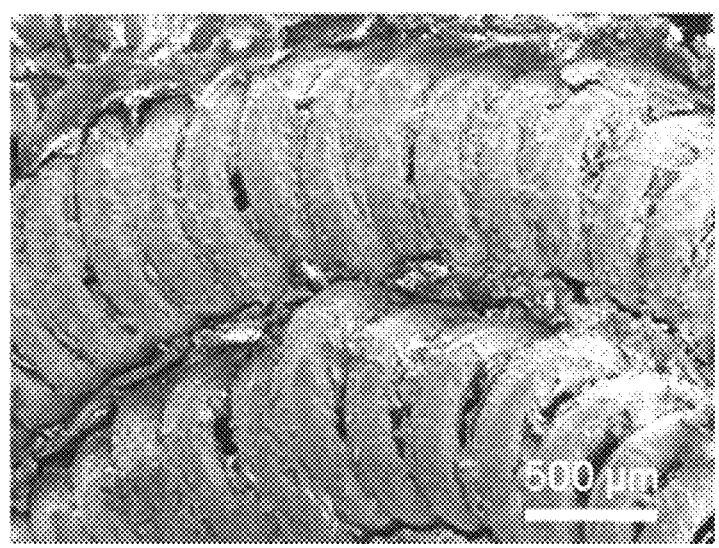
FIGS. 2A and 2B are scanning electron microscope (SEM) images showing analysis results of a negative electrode for a coin half-cell used in Example 1, before lithium electrodeposition, at magnifications of ×100 and ×500, respectively.
Figure 2B:
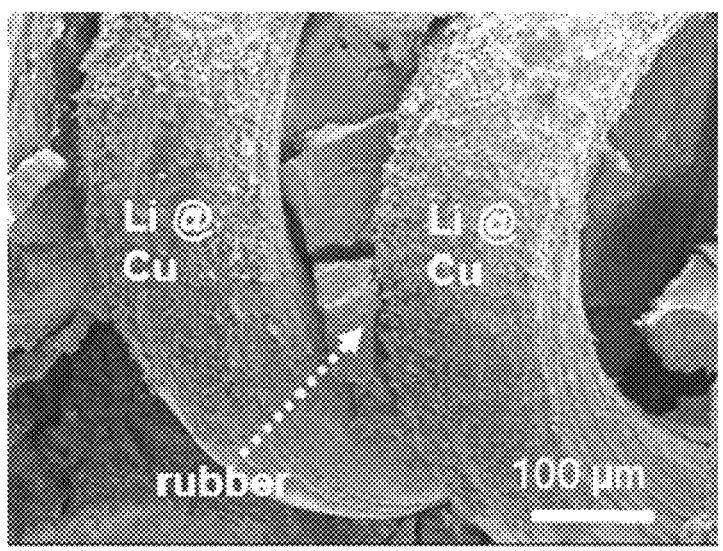

Referring to FIGS. 2A and 2B, it can be confirmed that the anode for a coin half-cell before lithium electrodeposition of Example 1 is configured such that the elastic polymer, i.e., SEBS, is embedded inside the coil spring and a space between the spiral coils of the spiral-type wound coil springs.

Evaluation Example 1

Electrical Resistance Measurement

Electrical resistances of the spiral-type Cu coil spring current collector with the SEBS block copolymer embedded therein of Example 1 were measured at 0% elongation (before stretching), at 60% elongation, and at 80% elongation. The results thereof are shown in FIG. 3A, FIG. 3B, and FIG. 3C, respectively.

Figure 3A:
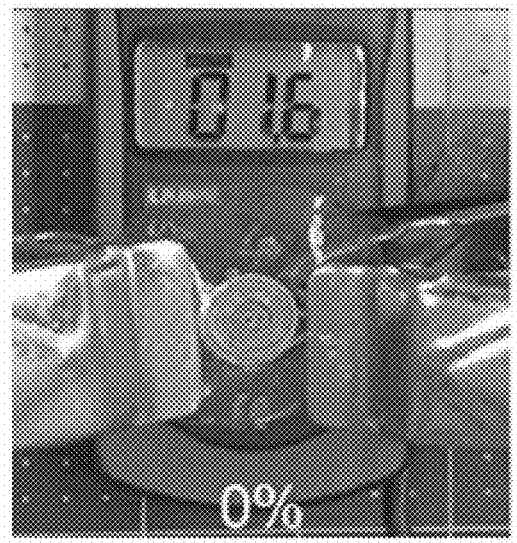
FIGS. 3A to 3C are images showing electrical resistance measurement results of a spiral-type copper coil spring current collector, used in Example 1, having a poly(styrene-ethylene-butylene-styrene) (SEBS) block copolymer embedded therein, at 0% elongation (before stretching), 60% elongation, and 80% elongation, respectively.
Figure 3B:
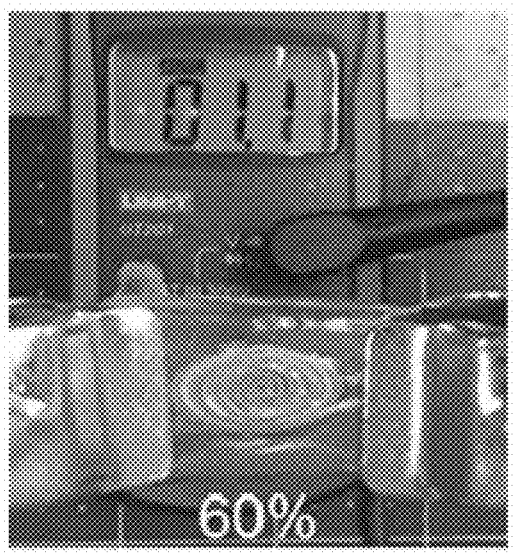
Figure 3C:
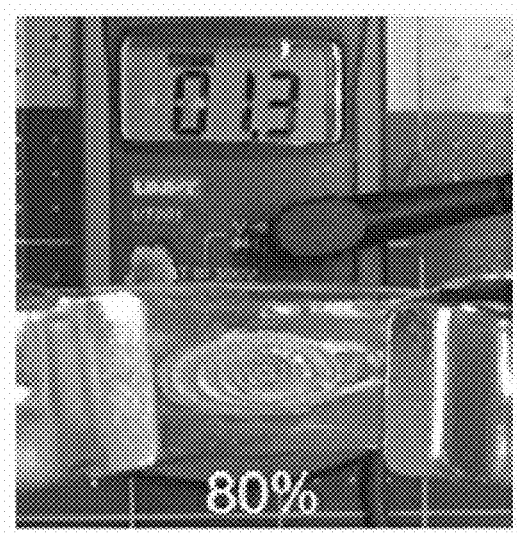

Referring to FIG. 3A, FIG. 3B, and FIG. 3C, the spiral-type Cu coil spring current collector with the SEBS block copolymer embedded therein of Example 1 exhibited electrical resistance measurement values of 1.6Ω, 1.1Ω, and 1.3Ω at 0% elongation (before stretching), at 60% elongation, and at 80% elongation, respectively.

It can be confirmed that the spiral-type Cu coil spring current collector with the SEBS block copolymer embedded therein of Example 1 exhibits a difference between electrical resistances at 80% elongation and before stretching of 0.5Ω or less.

Evaluation Example 2

Evaluation of Charge/Discharge Characteristics

Charge/discharge experimental evaluation was performed using a 96-channel battery tester for the lithium secondary battery (coin half-cell), and using an LAND 8-channel battery tester for the lithium secondary battery (coin full-cell). A C-rate was calculated based on a theoretical capacity (170 mAh/g) of $LiFePO_4$.

Figure 4:
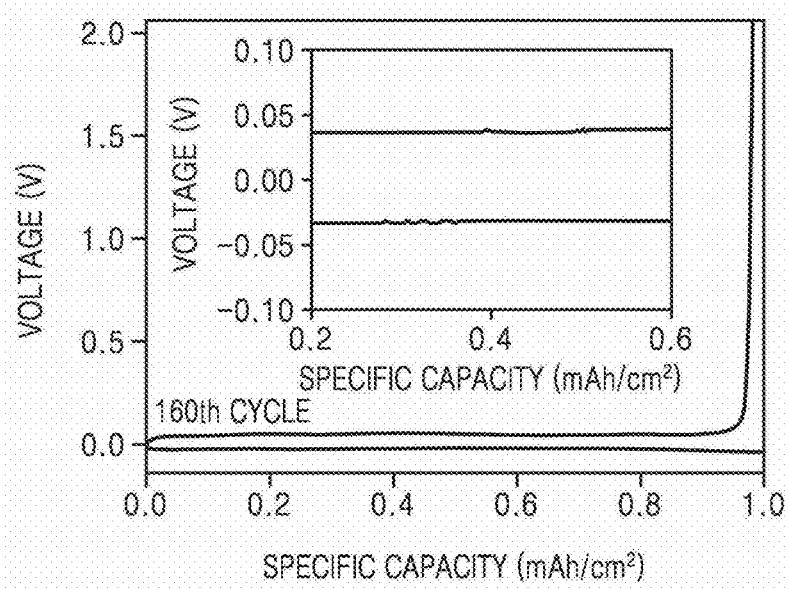
FIG. 4 is a graph of voltage (volts, V) versus specific capacity (milliampere hours per square centimeter, mAh/cm$^2$) showing the charge/discharge curve at a 160th cycle and an enlarged image of a plateau with respect to lithium secondary batteries (coin half-cells, inset) manufactured according to Example 1.

(1) Evaluation 1 of Charge/Discharge Characteristics of Lithium Secondary Battery (Coin Half-Cell)
(1-1) Overpotential and Coulombic Efficiency Each of the lithium secondary batteries (coin half-cells) manufactured according to Example 1 and Comparative Example 1 was subjected to constant current discharging at room temperature (25° C.) and a current density of 1 mA/cm² up to a capacity per unit area of 1 mAh/cm², and then was subjected to constant current charging at a current density of 1 mA/cm² until the cut-off voltage reached 2.0 V. Subsequently, the cycle of charging and discharging was repeated 179 times. That is, a total of 180 cycles of charging and discharging was performed. As a part of the results thereof, a charge/discharge curve at the 160th cycle and an enlarged plateau image is shown in FIG. 4, and Coulombic efficiency according to each cycle is shown in Table 1 below and FIG. 5A. In this case, the Coulombic efficiency was calculated from Equation 1 below.

In FIG. 4, an upper line denotes a charge curve, and a lower line denotes a discharge curve.

Referring to FIG. 4, the lithium secondary battery (coin half-cell) of Example 1 has a low overpotential, i.e., about 40 mV.

$$\text{Coulombic efficiency (\%)} = [(\text{discharge capacity at 180th cycle/charge capacity at 180}^{th}\text{ cycle}) \times 100] \quad \text{Equation 1}$$

TABLE 1

| | Coulombic efficiency (@180$^{th}$, %) |
|---|---|
| Example 1 | 97.5 |
| Comparative Example 1 | <<70 |

In addition, each of the lithium secondary batteries (coin half-cells) of Example 1 and Comparative Example 1 was subjected to constant current discharging at room temperature (25° C.) and a current density of 2 mA/cm² up to a capacity per unit area of 1 mAh/cm², and then was subjected to constant current charging at a current density of 2 mA/cm² until the cut-off voltage reached 2.0 V. Subsequently, the cycle of charging and discharging was repeated 49 times. That is, a total of 50 cycles of charging and discharging was performed. The results thereof are shown in Table 2 below and FIG. 5B. In this case, the Coulombic efficiency was calculated by substituting the 180th cycle by 50$^{th}$ cycle in Equation 1.

TABLE 2

| | Coulombic efficiency (@50$^{th}$, %) |
|---|---|
| Example 1 | 96 |
| Comparative Example 1 | <<70 |

Figure 5A:
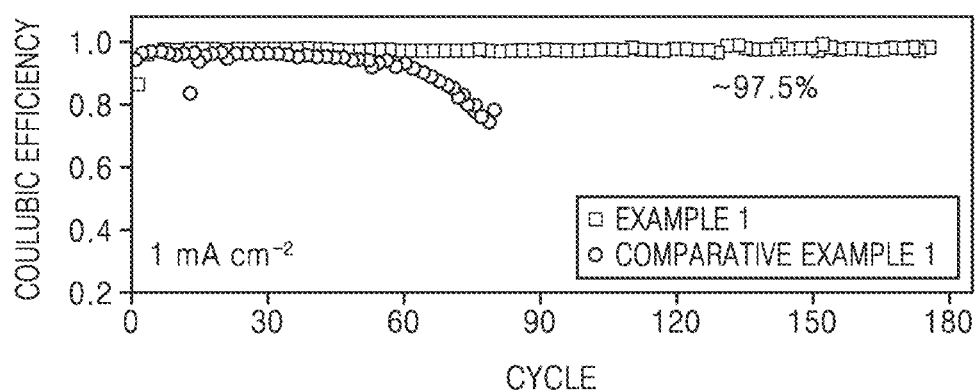
FIG. 5A is a graph of Coulombic efficiency (percent/100) versus cycle number, showing Coulombic efficiency according to each of 180 cycles of charging and discharging of the lithium secondary batteries (coin half-cells) of Example 1 and Comparative Example 1, wherein the charging and the discharging were performed at room temperature (25° C.) and a current density of 1 milliamperes per square centimeter (mA/cm$^2$) up to a capacity per unit area of 1 mAh/cm$^2$.
Figure 5B:
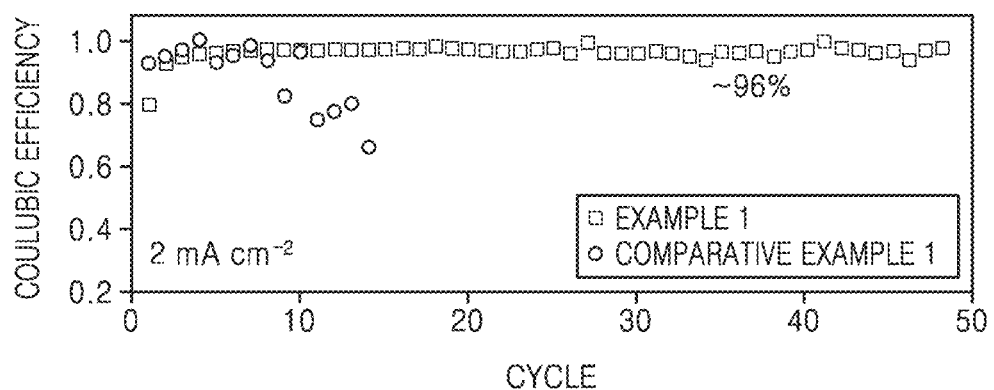
FIG. 5B is a graph of Coulombic efficiency (percent/100) versus cycle number, showing Coulombic efficiency according to each of 50 cycles of charging and discharging of the lithium secondary batteries (coin half-cells) of Example 1 and Comparative Example 1, wherein the charging and discharging were performed at room temperature (25° C.) and a current density of 2 mA/cm$^2$ up to a capacity per unit area of 1 mAh/cm$^2$.

Referring to Tables 1 and 2 and FIGS. 5A and 5B, even though the current density was increased from 1 mA/cm² to 2 mA/cm² during constant current discharging, high Coulombic efficiency was obtained at almost the same level, and the Coulombic efficiency maintained 96% or more.

(1-2) Charging/Discharging Behavior and Coulombic Efficiency Before and After 60% Elongation The lithium secondary battery (coin half-cell) of Example 1 was subjected to constant current discharging at room temperature (25° C.) and a current density of 1 mA/cm² up to a capacity per unit area of 1 mAh/cm² before stretching and at 60% elongation, respectively, and then was subjected to constant current charging at a current density of 1 mA/cm² until the cut-off voltage reached 2.0 V, wherein the cycle of charging and discharging was performed once. The results thereof are shown in FIG. 6.

Figure 6:
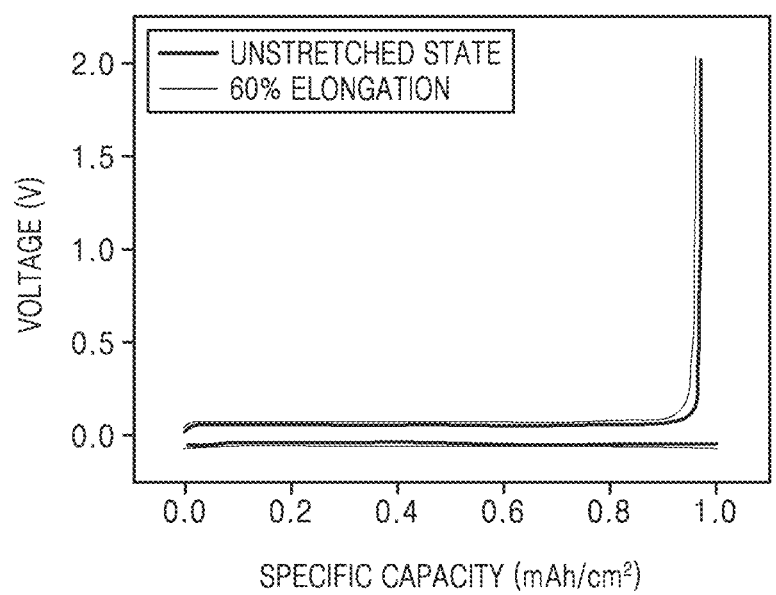
FIG. 6 is a graph of voltage (V) versus specific capacity (mAh/cm$^2$) showing the charge/discharge curve at the 1st cycle of the lithium secondary battery (coin half-cell) of Example 1 in an unstretched state and at 60% elongation, wherein charging and discharging were performed at room temperature (25° C.) and a current density of 1 mA/cm² up to a capacity per unit area of 1 mAh/cm².

Referring to FIG. 6, the lithium secondary battery (coin half-cell) of Example 1 exhibited almost the same charging/discharging behavior before stretching and at 60% elongation.

Subsequently, the cycle of charging and discharging was repeatedly performed 29 times on the lithium secondary battery (coin half-cell) of Example 1 before stretching and at 60% elongation, and thus a total of 30 cycles of charging and discharging was performed. The results thereof are shown in Table 3 below and FIG. 7. In this case, a Coulombic efficiency was calculated by substituting the 180$^{th}$ cycle by 30th cycle in Equation 1.

TABLE 3

| | Coulombic efficiency (@30$^{th}$, %) |
|---|---|
| Example 1 (before stretching) | 97.6 |
| Example 1 (at 60% elongation) | 97.2 |

Figure 7:
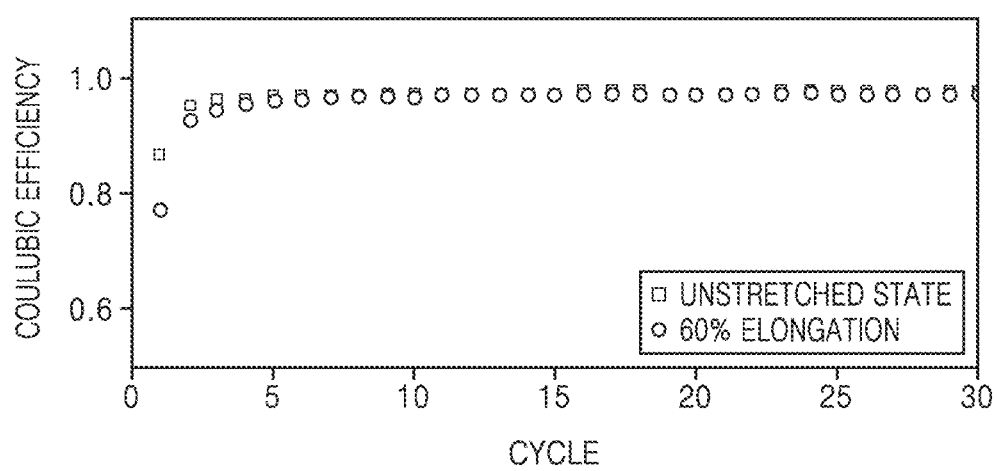
FIG. 7 is a graph of Coulombic efficiency (percent/100) versus cycle number, showing Coulombic efficiency according to each of 30 cycles of charging and discharging of the lithium secondary battery (coin half-cell) of Example 1 in an unstretched state and at 60% elongation, wherein the charging and the discharging were performed at room temperature (25° C.) and a current density of 1 mA/cm² up to a capacity per unit area of 1 mAh/cm².

Referring to Table 3 and FIG. 7, the lithium secondary battery (coin half-cell) of Example 1 exhibited excellent Coulombic efficiency as almost the same as 97% or more before stretching and at 60% elongation.

(1-3) Discharge Capacity and Coulombic Efficiency Before and After Stretching 100 times to 60% elongation The lithium secondary battery (coin half-cell) of Example 1 was subjected to constant current discharging at room temperature (25° C.) and a current density of 1 mA/cm² up to a capacity per unit area of 1 mAh/cm² in a state in which 60% elongation was performed 100 times, and then was subjected to constant current charging at a current density of 1 mA/cm² until the cut-off voltage reached 2.0 V, wherein the cycle of charging and discharging was performed once. Subsequently, the same charging/discharging experiment was performed once on the lithium secondary battery (coin half-cell) of Example 1 in a state back to before stretching. The results thereof are shown in FIG. 8.

Figure 8:
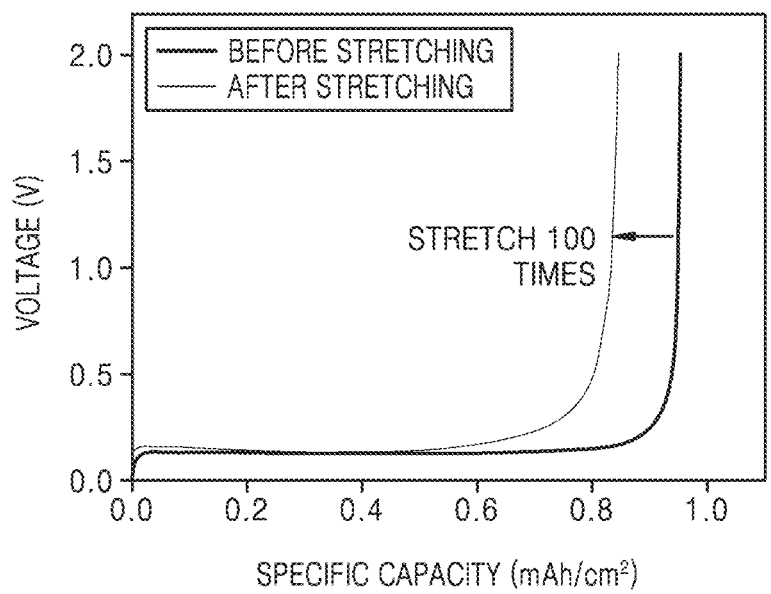
FIG. 8 is a graph of voltage (V) versus specific capacity (mAh/cm²) showing the charge/discharge curve at the 1St cycle of the lithium secondary battery (coin half-cell) of Example 1 after 60% elongation that was repeated 100 times and before stretching, wherein charging and discharging were performed at room temperature (25° C.) and a current density of 1 mA/cm² up to a capacity per unit area of 1 mAh/cm².

Referring to FIG. 8, the lithium secondary battery (coin half-cell) of Example 1 in a state in which stretching to 60% elongation was performed 100 times maintained 90% or more of discharge capacity, as compared to the lithium secondary battery (coin half-cell) of Example 1 in a state back to before stretching.

In addition, the same cycle of charging and discharging was further performed 3 times on the lithium secondary battery (coin half-cell) in a state back to before stretching. Subsequently, the same cycle of charging and discharging was performed 9 times on the lithium secondary battery (coin half-cell) of Example 1 in a state in which stretching to 60% elongation was performed 100 times, and thus a total of 12 cycles of charging and discharging was performed. The results thereof are shown in Table 4 below and FIG. 9. In this case, a Coulombic efficiency was calculated by substituting the 180th cycle by 12th cycle in Equation 1.

TABLE 4

|  | Coulombic efficiency |
|---|---|
| Example 1 (before stretching, @ $3^{rd}$, %) | 96.58 |
| Example 1 (at 60% elongation 100 times, @ $12^{th}$, %) | 96.64 |

Figure 9:
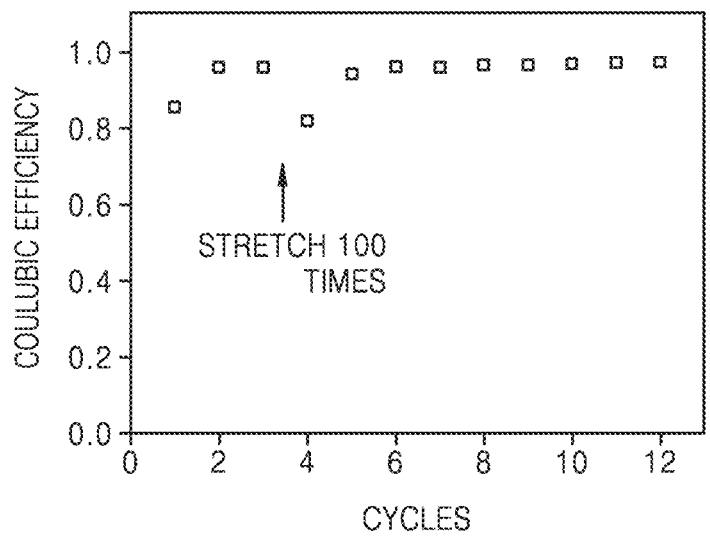
FIG. 9 is a graph of Coulombic efficiency (percent/100) versus cycle number, showing Coulombic efficiency of the lithium secondary battery (coin half-cell) of Example 1 according to each of 1st to $3^{rd}$ cycles of charging and discharging in the state measured before stretching as in FIG. 8 and each of 4th to 12th cycles of charging and discharging after 60% elongation was repeated 100 times as in FIG. 8, wherein the charging and the discharging were performed at room temperature (25° C.) and a current density of 1 mA/cm² up to a capacity per unit area of 1 mAh/cm².

Referring to Table 4 and FIG. 9, both the lithium secondary battery (coin half-cell) of Example 1 in a state back to before stretching and the lithium secondary battery (coin half-cell) of Example 1 in a state in which stretching to 60% elongation was performed 100 times exhibited as high Coulombic efficiency as 96% or more, and did not exhibit a decrease in Coulombic efficiency due to strain.

(2) Evaluation 2 of Charge/Discharge Characteristics of Lithium Secondary Battery (Coin Full-Cell)

(2-1) Charging/Discharging Behavior and Lifespan Characteristics

The full-cell manufactured according to Example 2 was subjected to an initial formation cycle at C/10 and room temperature (25° C.) under voltage conditions of 2.5 V to 4.0 V vs Li metal, was charged at a constant current of C/5 until the voltage reached 4.0 V, and then was discharged at a constant current of each of C/10 and C/5 (1C=170 mA/g) until the cut-off voltage reached 2.5 V. Subsequently, the same cycle of charging and discharging was repeatedly performed 34 times on the full-cell of Example 2, and thus a total of 35 cycles of charging and discharging was performed. The results thereof are shown in Table 5 below and FIG. 11. In this case, a cycle retention (%) was calculated from Equation 2 below:

Cycle retention (%)=[(discharge capacity at $35^{th}$ cycle/discharge capacity at $1^{st}$ cycle)×100]  Equation 2

TABLE 5

| Constant current | Cycle capacity retention (@$35^{th}$, %) |
|---|---|
| C/5 | 100 |

Figure 11:
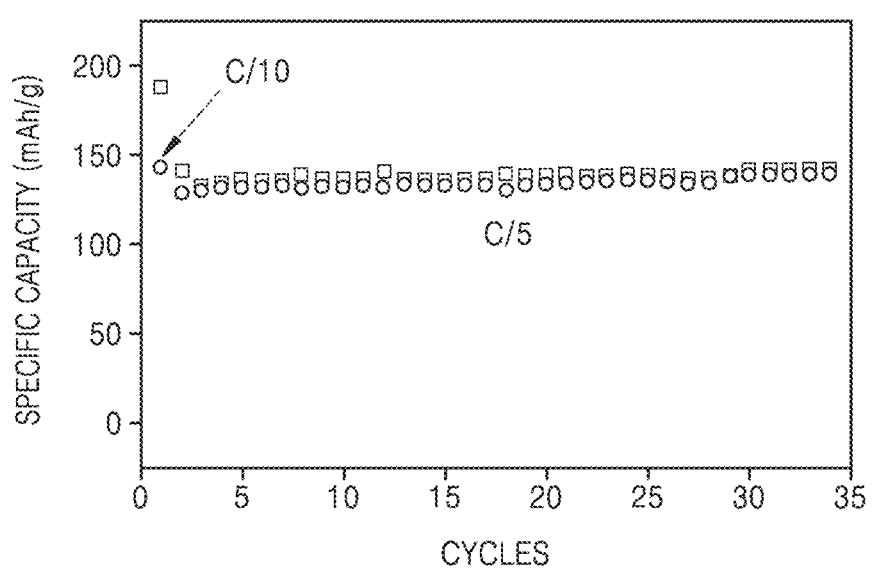
FIG. 11 is a graph of specific capacitance (milliampere hours per gram, mAh/g) versus cycle number, showing experimental results of charging and discharging of a lithium secondary battery (coin full-cell) according to Example 2.

Referring to Table 5 and FIG. 11, the full-cell of Example 2, on which the charging/discharging experiment was performed at a constant current of C/5, exhibited as high cycle capacity retention as 100%.

As is apparent from the foregoing description, a stretchable electrode includes: a current collector; and a metal layer or an electrode active material layer disposed on a surface of the current collector, wherein the current collector includes a spiral-type coin spring and an elastic polymer, the spiral-type coil spring comprising a coil spring wound in a spiral pattern around a point, and wherein the elastic polymer may be disposed in at least a portion of an inside of the coil spring, in at least a portion of a space between spiral coils of the spiral-type coil spring, or both. According to the stretchable electrode, an electrochemical device including the same, and a method of manufacturing the stretchable electrode, charge/discharge characteristics such as Coulombic efficiency and lifespan characteristics may be enhanced both before stretching and after stretching.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A stretchable electrode comprising:
   a current collector; and
   disposed on a surface of the current collector, a metal layer or an electrode active material layer,
   wherein the current collector comprises a spiral-type coil spring and an elastic polymer, the spiral-type coil spring comprising a helical coil spring arranged in a spiral pattern away from a central point in a two-dimensional plane, and
   wherein the elastic polymer is disposed in at least a portion of an inside of the coil spring, in at least a portion of a space between spiral coils of the spiral-type coil spring, or both.

2. The stretchable electrode of claim 1, wherein the metal layer or the electrode active material layer has a shape corresponding to that of the current collector.

3. The stretchable electrode of claim 1, wherein the spiral-type coil spring has an inner diameter of about 10 micrometers to about 500 micrometers.

4. The stretchable electrode of claim 1, wherein the diameter of the coil spring is about 50 micrometers to about 800 micrometers.

5. The stretchable electrode of claim 1, wherein the spiral-type coil spring comprises copper, stainless steel, aluminum, nickel, or titanium; copper or stainless steel wherein each is surface-treated with carbon, nickel, titanium, or silver; an aluminum-cadmium alloy; or a combination thereof.

6. The stretchable electrode of claim 1, wherein the current collector has a maximum elongation of 100%.

7. The stretchable electrode of claim 1, wherein a difference in electrical resistance between the current collector at 0% elongation and the current collector at 80% elongation is about 0.5 ohm or less.

8. The stretchable electrode of claim 1, wherein the metal layer comprises an alkali metal.

9. The stretchable electrode of claim 1, wherein the metal layer is electrodeposited on the surface of the current collector during operation of an electrochemical device comprising the stretchable electrode.

10. The stretchable electrode of claim 9, wherein the metal layer is electrodeposited at a capacity per unit area of about 0.5 milliampere hours per square centimeter to about 6 milliampere hours per square centimeter.

11. The stretchable electrode of claim 1, wherein the electrode active material layer is a coating layer comprising an electrode active material, a conductive material, and a binder.

12. The stretchable electrode of claim 11, wherein the electrode active material comprises a lithium transition metal oxide.

13. The stretchable electrode of claim 1, wherein the elastic polymer is a thermoplastic elastic polymer comprising a polystyrene, a polyester, a polyolefin, a polyurethane, a copolymer thereof, or a combination thereof.

14. The stretchable electrode of claim 1, wherein the elastic polymer comprises a poly(styrene-butadiene) block copolymer, a poly(styrene-butadiene-styrene) block copolymer, a poly(styrene-isoprene-styrene) block copolymer, a poly(styrene-ethylene-butylene-styrene) block copolymer, a polyurethane, or a combination thereof.

15. The stretchable electrode of claim 1, wherein the elastic polymer has a weight average molecular weight of about 80,000 Dalton to about 1,500,000 Dalton, as determined by gel permeation chromatography using a polystyrene standard.

16. An electrochemical device comprising:
the stretchable electrode according to claim 1, as a first electrode;
a second electrode; and
an electrolyte disposed between the first electrode and the second electrode.

17. The electrochemical device of claim 16, wherein the first electrode is an anode.

18. The electrochemical device of claim 16, wherein a capacity after stretching to 60% elongation 100 times is about 90% or more of a capacity before stretching.

19. The electrochemical device of claim 16, wherein a Coulombic efficiency after stretching to 60% elongation 100 times and a Coulombic efficiency before stretching are both about 90% or more after the 30th cycle.

20. A method of manufacturing the stretchable electrode according to claim 1, the method comprising:
winding the coil spring in the spiral pattern around the point to provide the spiral-type coil spring;
fabricating a spiral-type coil spring current collector by contacting the spiral-type coil spring and an elastic polymer solution;
drying the spiral-type coil spring current collector, wherein the elastic polymer is disposed in the at least a portion of the inside the coil spring, in the at least a portion of the space between spiral coils of the spiral-type coil spring, or both; and
disposing the metal layer or the electrode active material on the surface of the spiral-type coil spring current collector after removing the elastic polymer from the surface of the spiral-type coil spring current collector.

21. The stretchable electrode of claim 1, wherein the helical coil spring is not uncoiled within the spiral pattern.

* * * * *